US012621160B2

(12) United States Patent
Tsuchida

(10) Patent No.: US 12,621,160 B2
(45) Date of Patent: May 5, 2026

(54) SECURE COMPUTATION SYSTEM, SECURE COMPUTATION SERVER APPARATUS, SECURE COMPUTATION METHOD, AND SECURE COMPUTATION PROGRAM

(71) Applicant: NEC Corporation, Tokyo (JP)

(72) Inventor: Hikaru Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 444 days.

(21) Appl. No.: 18/275,325

(22) PCT Filed: Feb. 10, 2021

(86) PCT No.: PCT/JP2021/004893
§ 371 (c)(1),
(2) Date: Aug. 1, 2023

(87) PCT Pub. No.: WO2022/172345
PCT Pub. Date: Aug. 18, 2022

(65) Prior Publication Data
US 2024/0106654 A1 Mar. 28, 2024

(51) Int. Cl.
*H04L 9/32* (2006.01)
(52) U.S. Cl.
CPC ........ *H04L 9/3236* (2013.01); *H04L 2209/46* (2013.01)
(58) Field of Classification Search
CPC ... H04L 9/3236; H04L 2209/46; H04L 9/085; G09C 1/00
USPC ........................................................ 713/168
See application file for complete search history.

(56) References Cited

U.S. PATENT DOCUMENTS

| | | | |
|---|---|---|---|
| 11,689,371 B2 * | 6/2023 | Yadlin | H04L 9/3247 |
| | | | 713/168 |
| 2011/0202766 A1 * | 8/2011 | Lerner | H04L 63/065 |
| | | | 713/168 |

(Continued)

FOREIGN PATENT DOCUMENTS

| | | |
|---|---|---|
| JP | 2012-027587 A | 2/2012 |
| JP | WO2015/107952 A1 | 7/2015 |

(Continued)

OTHER PUBLICATIONS

International Search Report for PCT Application No. PCT/JP2021/004893, mailed on Apr. 27, 2021.

(Continued)

*Primary Examiner* — Badri Narayanan Champakesan
(74) *Attorney, Agent, or Firm* — Sughrue Mion, PLLC

(57) ABSTRACT

A secure computation server apparatus in a secure computation system includes: a table storage part that stores a table of secret shares of the product of a first value and a second value for combinations of shares of possible values of the first value and shares of possible values of the second value; a table shuffle part that shuffles indices of possible values of the first value and indices of possible values of the second value in the table; a multiplication part that selects an element in the table whose indices in the shuffled table match the first and the second values; and a comparative verification part that accepts data that a majority of other secure computation server apparatuses agrees on as a correct value out of a plurality of data received from the other secure computation server apparatuses.

16 Claims, 6 Drawing Sheets

(56) References Cited

U.S. PATENT DOCUMENTS

2015/0237020 A1*  8/2015  Rohloff .............. H04L 63/0428
                                                        713/168
2015/0349958 A1*  12/2015  Lindell ................... G06F 21/31
                                                        713/168
2016/0335924 A1*  11/2016  Ikarashi ................... G09C 1/00
2020/0125724 A1*  4/2020  Ikarashi ................. H04L 9/085
2020/0228314 A1*  7/2020  Ikarashi ............... H04L 9/0631
2023/0246825 A1*  8/2023  Pettit .................... H04L 9/0825
                                                        713/171
2024/0430074 A1*  12/2024  Tsuchida ................. G09C 1/00

FOREIGN PATENT DOCUMENTS

JP        WO2018/216512  A1     11/2018
JP        WO2019/039381  A1      2/2019

OTHER PUBLICATIONS

English translation of Written opinion for PCT Application No. PCT/JP2021/004893, mailed on Apr. 27, 2021.
Byali, M., Chaudhari, H., Patra, A., & Suresh, A., FLASH: fast and robust framework for privacy-preserving machine learning, Proceedings on Privacy Enhancing Technologies, 2020(2), 459-480.
Hamada, Koki et al., A batch mapping algorithm for secure function evaluation, IEICE Transactions A, vol. J96-A, No. 4, pp. 157-165, Apr. 1, 2013, Japan.
Tsujishita, Kentaro, et al., Application of password protected secret sharing scheme to searchable encryption, Research Report Internet of Things and Operational Technology (IOT), vol. 2017-IOT-37, No. 15, pp. 1-8, May 18, 2017, Japan.

* cited by examiner

SECURE COMPUTATION SYSTEM, SECURE COMPUTATION SERVER APPARATUS, SECURE COMPUTATION METHOD, AND SECURE COMPUTATION PROGRAM

This application is a National Stage Entry of PCT/JP2021/004893 filed on Feb. 10, 2021, the contents of all of which are incorporated herein by reference, in their entirety.

FIELD

The present invention relates to a secure computation system, secure computation server apparatus, secure computation method, and secure computation program.

BACKGROUND

In recent years, the research and developments of a technology called secure computation are active. Secure computation is a technique that executes a predetermined process while keeping the computation process and the results thereof secret from a third party. Multi-party computation is one of the representative techniques of secure computation. In multi-party computation, confidential data is distributed to a plurality of servers (secure computation server apparatuses), and arbitrary computations are executed on the data while secrecy is maintained. Further, the data distributed to each secure computation server apparatus is called a "share." Hereinafter, the term "secure computation" as used herein refers to multi-party computation, unless otherwise specified.

Even among the techniques generally called secure computations, there are different levels of security achieved. For instance, let's assume that an adversary is among the participants of a multi-party group that performs secure computation. In this case, between a secure computation technique that can detect the presence of the adversary and interrupt the process, and one that can obtain the correct computation results without interrupting the process despite the presence of the adversary, the latter is more secure than the former. Further, secure computation that satisfies the security of the latter is called Guaranteed Output Delivery (GOD), and an example of secure computation that achieves this is known (for instance, refer to Non-Patent Literature 1).

Non-Patent Literature 1

Byali, M., Chaudhari, H., Patra, A., & Suresh, A., "FLASH: Fast and Robust Framework for Privacy-preserving Machine Learning," Proceedings on Privacy Enhancing Technologies, 2020 (2): 459-480.

SUMMARY

The disclosure of each literature in Citation List above is incorporated herein in its entirety by reference thereto. The following analysis is given by the present inventor.

In evaluating the security of secure computation, not only the achievable security effects but also premises are important. A typical premise is provided by the random oracle model or random oracle hypothesis for a hash function.

A hash function returns a unique output for an input, but is configured so that it is difficult to infer the input from the output. Here, being difficult to do so does not guarantee that it is absolutely impossible. Therefore, security is evaluated on the premise that the hash function used has no vulnerability. The security provided by this premise is described as "being secure in the random oracle model" or "being secure under the random oracle hypothesis." The secure computation described in Non-Patent Literature 1 is "secure in the random oracle model."

Meanwhile, the opposite of "being secure in the random oracle model" is "being secure in the standard model." In other words, even if the input can be inferred from the output of a hash function, this itself does not become a vulnerability of the secure computation scheme. It goes without saying that, with the same level of achievable security, being secure in the standard model is able to achieve a higher level of security than being secure in the random oracle model.

Further, the number of participants in the secure computation described in Non-Patent Literature 1 is limited to four, and this further limits applicable scenarios. Therefore, flexibility in terms of the number of participants is also desired.

In view of the problem above, it is an object of the present invention to provide a secure computation system, secure computation server apparatus, secure computation method, and secure computation program that contribute to improving security and flexibility.

According to a first aspect of the present invention, there is provided a secure computation system comprising a plurality of secure computation server apparatuses connected to each other via a network and performing secure computation of secret shares of the product of a secret-shared first value and a secret-shared second value from shares of the first value and shares of the second value, wherein each of the secure computation server apparatuses includes a table storage part that stores a table of secret shares of the product of the first value and the second value for combinations of shares of possible values of the first value and shares of possible values of the second value; a table shuffle part that shuffles indices of possible values of the first value and indices of possible values of the second value in the table; a multiplication part that selects an element in the table whose indices in the shuffled table match the first and the second values; and a comparative verification part that accepts data that a majority of other secure computation server apparatuses agrees on as a correct value out of a plurality of data received from the other secure computation server apparatuses.

According to a second aspect of the present invention, there is provided a secure computation server apparatus out of a plurality of secure computation server apparatuses connected to each other via a network to perform secure computation of secret shares of the product of a secret-shared first value and a secret-shared second value from shares of the first value and shares of the second value, the secure computation server apparatus including: a table storage part that stores a table of secret shares of the product of the first value and the second value for combinations of shares of possible values of the first value and shares of possible values of the second value; a table shuffle part that shuffles indices of possible values of the first value and indices of possible values of the second value in the table; a multiplication part that selects an element in the table whose indices in the shuffled table match the first and the second values; and a comparative verification part that accepts data that a majority of other secure computation server apparatuses agrees on as a correct value out of a plurality of data received from the other secure computation server apparatuses.

According to a third aspect of the present invention, there is provided a secure computation method, with a plurality of secure computation server apparatuses connected to each other via a network, performing secure computation of secret shares of the product of a secret-shared first value and a secret-shared second value from shares of the first value and shares of the second value, wherein each of the secure computation server apparatuses stores a table of secret shares of the product of the first value and the second value for combinations of shares of possible values of the first value and shares of possible values of the second value; shuffles indices of possible values of the first value and indices of possible values of the second value in the table; selects an element in the table whose indices in the shuffled table match the first and the second values; and accepts data that a majority of other secure computation server apparatuses agrees on as a correct value out of a plurality of data received from the other secure computation server apparatuses.

According to a fourth aspect of the present invention, there is provided a secure computation program causing a plurality of secure computation server apparatuses connected to each other via a network to execute processing to perform secure computation of secret shares of the product of a secret-shared first value and a secret-shared second value from shares of the first value and shares of the second value, the secure computation program stores a table of secret shares of the product of the first value and the second value for combinations of shares of possible values of the first value and shares of possible values of the second value; shuffles indices of possible values of the first value and indices of possible values of the second value in the table; selects an element in the table whose indices in the shuffled table match the first and the second values; and accepts data that a majority of other secure computation server apparatuses agrees on as a correct value out of a plurality of data received from the other secure computation server apparatuses. Further, this program can be stored in a computer-readable storage medium. The storage medium may be a non-transient one such as a semiconductor memory, a hard disk, a magnetic recording medium, an optical recording medium, and the like. The present invention can also be realized as a computer program product.

According to each aspect of the present invention, it becomes possible to provide a secure computation system, secure computation server apparatus, secure computation method, and secure computation program that contribute to improving security and flexibility.

EXAMPLE EMBODIMENTS

Example embodiments of the present invention will be described with reference to the drawings. The present invention, however, is not limited to the example embodiments described below. Further, in each drawing, the same or corresponding elements are appropriately designated by the same reference signs. It should also be noted that the drawings are schematic, and the dimensional relationships and the ratios between the elements may differ from the actual ones. The dimensional relationships and the ratios between drawings may also be different in some sections.

First Example Embodiment

Figure 1:
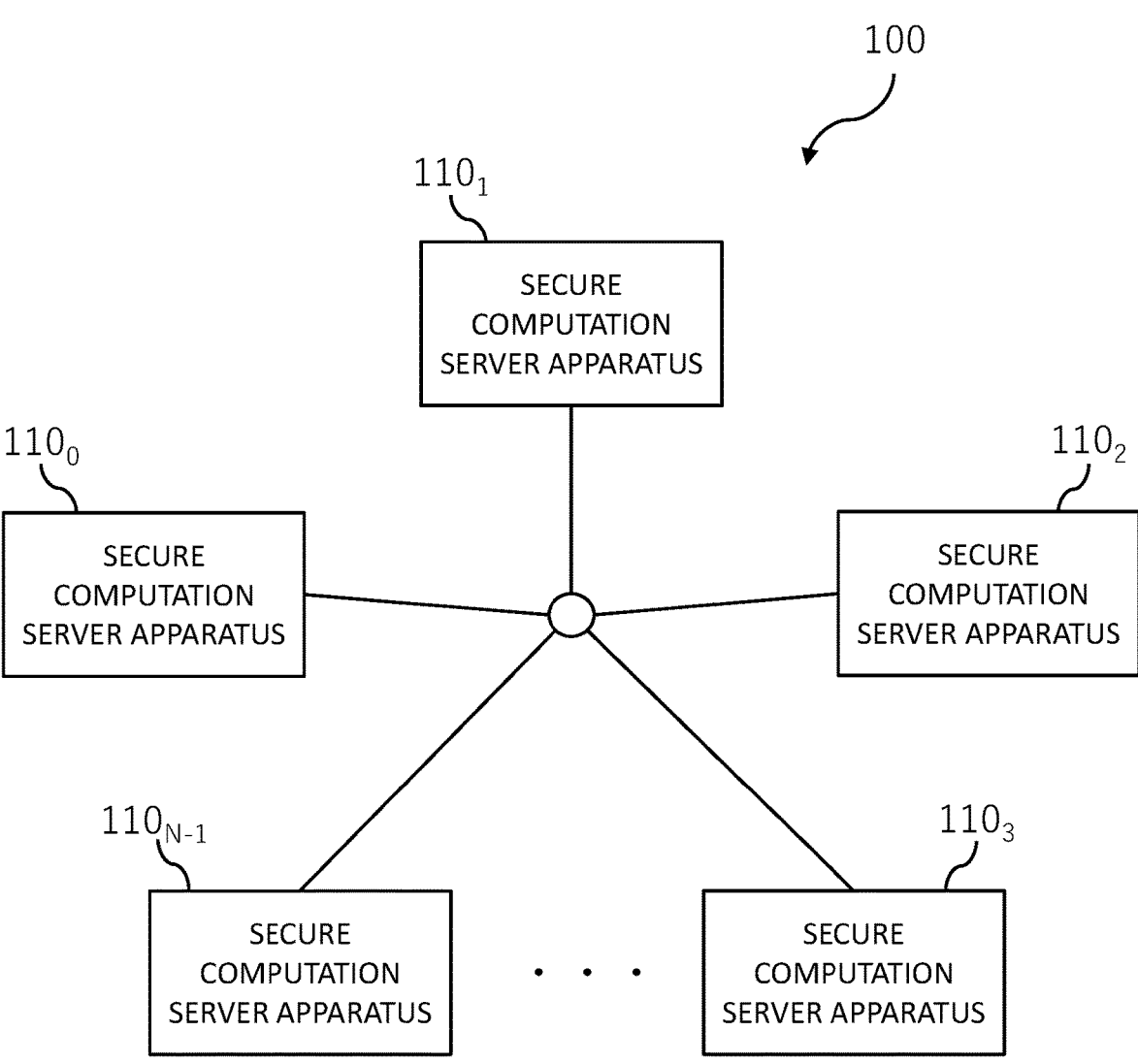
FIG. 1 is a block diagram showing an example of the functional configuration of a secure computation system according to a first example embodiment.
Figure 2:
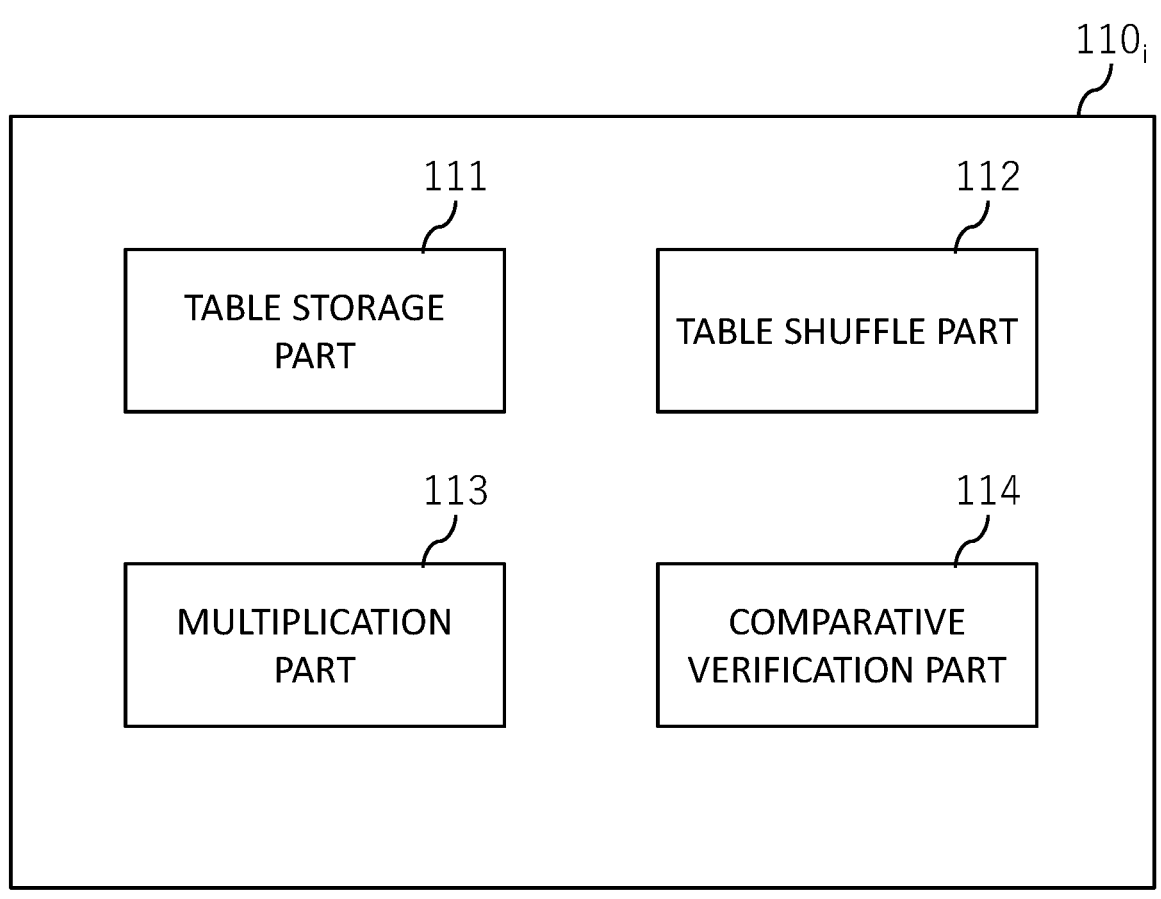
FIG. 2 is a block diagram showing an example of the functional configuration of a secure computation server apparatus according to the first example embodiment.

The following describes a secure computation system and a secure computation server apparatus relating to a first example embodiment with reference to FIGS. 1 and 2. In the first example embodiment, only the basic concept of the present invention is described.

FIG. 1 is a block diagram showing an example of the functional configuration of the secure computation system relating to the first example embodiment. As shown in FIG. 1, the secure computation system 100 relating to the first example embodiment comprises 0-th to (N−1)-th secure computation server apparatuses 110$_i$ (i=0, 1, . . . , N−1) (N is a natural number). The 0-th to the (N−1)-th secure computation server apparatuses 110$_i$ (i=0, 1, . . . , N−1) are connected to each other via a network so as to be able to communicate with each other. A circle in the center of FIG. 1 indicates the network.

The secure computation system 100 comprising the 0-th to the (N−1)-th secure computation server apparatuses 110$_i$ (i=0, 1, . . . , N−1) is able to compute desired shares of a value supplied by any one of the 0-th to the (N−1)-th secure computation server apparatuses 110$_i$ (i=0, 1, . . . , N−1) as an input while keeping the input value and the values during the computation process secret, and distribute the computation results to the 0-th to the (N−1)-th secure computation server apparatuses 110$_i$ (i=0, 1, . . . , N−1) to store them therein.

Further, the secure computation system 100 comprising the 0-th to the (N−1)-th secure computation server apparatuses 110$_i$ (i=0, 1, . . . , N−1) is able to compute desired shares of shares distributed to and stored in the 0-th to the (N−1)-th secure computation server apparatuses 110$_i$ (i=0, 1, . . . , N−1) while keeping the values during the computation process secret, and distribute the computation results to the 0-th to the (N−1)-th secure computation server apparatuses 110$_i$ (i=0, 1, . . . , N−1) to store them therein.

Further, the shares that resulted from the computations above may be reconstructed by having the 0-th to the (N−1)-th secure computation server apparatuses 110$_i$ (i=0, 1, . . . , N−1) exchange the shares with each other. Alternatively, the shares may be reconstructed by transmitting them to an external apparatus, instead of the 0-th to the (N−1)-th secure computation server apparatuses 110$_i$ (i=0, 1, . . . , N−1).

Each of the 0-th to the (N−1)-th secure computation server apparatuses 110$_i$ (i=0, 1, . . . , N−1) is operated by an independent party P$_i$ (i=0, 1, . . . , N−1). Further, the secure computation system 100 comprising the 0-th to the (N−1)-th secure computation server apparatuses 110$_i$ (i=0, 1, . . . , N−1) is able to continue correct secure computation without interrupting the process even when some of the 0-th to the (N−1)-th secure computation server apparatuses 110$_i$ (i=0, 1, . . . , N−1) are operated by adversaries.

For instance, each of the 0-th to the (N−1)-th secure computation server apparatuses 110$_i$ (i=0, 1, . . . , N−1) may employ the following configuration.

Shares of a residue class ring $Z_L$ of modulo L for each party P$_i$ (i=0, 1, . . . , N−1) are defined as follows.

The shares over the residue class ring $Z_L$ of an element $x \in Z_L$ of the residue class ring $Z_L$ of modulo L are expressed as below:

$$[x]_L = ([x]_{L,0}, [x]_{L,1}, \ldots, [x]_{L,N-1})$$

Decompose the element $x \in Z_L$ of the residue class ring $Z_L$ of modulo L to satisfy the relationship with:

$$x = x_0 + x_1 + \ldots + x_{N-1} \bmod L,$$

and define $[x]_{L,i}$ distributed to and held by each party $P_i$ (i=0, 1, . . . , N–1) as follows. In other words, the degree of replication is 3t+1, where t is the permissible number of adversaries and a natural number that satisfies t(3t+1)<N.

$$[x]_{L,i} = (x_i, x_{i+1}, \ldots, x_{i+3t}), \text{ where } x_{(N-1)+1} = x_0$$

When the shares $[x]_{L,0}, [x]_{L,1}, \ldots, [x]_{L,N-1}$ held by each party $P_i$ (i=0, 1, . . . , N–1) are defined as above, each party $P_i$ (i=0, 1, . . . , N–1) cannot reconstruct x from one of the shares $[x]_{L,0}, [x]_{L,1}, \ldots, [x]_{L,N-1}$ that he/she holds. Meanwhile, there is a secret sharing scheme in which x can be reconstructed by combining the shares held by at least t+1 of the parties $P_i$ (i=0, 1, . . . , N–1). This secret sharing scheme is called an (N–3t)-out-of-N replicated secret sharing scheme.

In this secret sharing scheme, in addition to when reconstructing x, performing secure computation such as multiplication will require a party $P_i$ to receive from another party $P_j$ a share value that $P_i$ does not have. At this time, since another $P_j$ should have the share value that the party $P_i$ does not have, the party $P_i$ is originally expected to receive the share value $P_i$ does not have from any one of the other parties $P_j$ and use it in computation. If, however, there is an adversary among the other parties $P_j$, he/she may transmit the wrong value, instead of the value that $P_i$ should receive. Then, $P_i$ may end up performing secure computation based on the wrong value, obtaining the wrong result, or may not be able to execute the computation itself normally in the first place.

Therefore, in the present example embodiment, the secure computation server apparatus $110_i$ comprises a table storage part 111, a table shuffle part 112, a multiplication part 113, and a comparative verification part 114, as shown in FIG. 2, to perform secure computation of secret shares of the product of a secret-shared first value and a secret-shared second value from shares of the first value and shares of the second value. FIG. 2 is a block diagram showing an example of the functional configuration of the secure computation server apparatus according to the first example embodiment.

More concretely, the following process example is conceivable.

The table storage part 111 stores a table of secret shares of the product of the first value and the second value for combinations of shares of possible values of the first value and shares of possible values of the second value. Here, the table is obtained by secret-sharing a so-called multiplication table. For instance, when the shares of the first value are $[i_x]_L$ ($i_x \in Z_L$) and the shares of the second value are $[j_y]_L$ ($j_y \in Z_L$), we get the following table. Although the table storage part 111 may store the table below in advance, it is sufficient to store $[Z_{i,j}] = [i_x j_y]$ in a variable as needed during actual implementation since this table can be easily constructed from ordinary multiplication.

6

TABLE 1

|  | [0] | [1] | . . . | [i] |  | . . . | [L – 1] |
|---|---|---|---|---|---|---|---|
| [0] |  |  |  | . |  |  |  |
| [1] |  |  |  | . |  |  |  |
| . |  |  |  | . |  |  |  |
| . |  |  |  |  |  |  |  |
| . |  |  |  |  |  |  |  |
| [j] |  | . . . |  | $[Z_{i,j}] = [i_x\, j_y]$ |  |  |  |
| . |  |  |  |  |  |  |  |
| [L – 1] |  |  |  |  |  |  |  |

With the table shown above, the secret shares $[i_x j_y]$ of the product of the first value $i_x$ and the second value $j_y$ can be obtained from the shares $[i_x]$ of the first value and the shares $[j_y]$ of the second value. Referring to the table directly, however, is problematic in secure computation because the share values $[i_x j_y]$ leak from the reference location in the table.

Therefore, the table shuffle part 112 shuffles the indices i of possible values of the first value $i_x$ and the indices j of possible values of the second value $j_y$ in the table. Here, we'll say that, by performing this shuffling, an index i is replaced with an index p, and an index j is replaced with an index q. Then, the shuffled table does not have row and column information, as shown below, for instance.

TABLE 2

|  | . . . | [p] | . . . |
|---|---|---|---|
| . |  | . |  |
| . |  | . |  |
| . |  | . |  |
| [q] | . . . | $[Z_{p,q}]$ |  |
| . |  |  |  |
| . |  |  |  |

As a result, it is not clear which row $j_y$ and which column $i_x$ should be referred to in order to obtain the secret shares $[i_x j_y]$ of the product of the first value $i_x$ and the second value $j_y$ since now each party does not know which index p replaced the index i and which index q replaced the index j.

Then, the multiplication part 113 obtains the secret shares $[i_x j_y]$ of the product of the first value $i_x$ and the second value $j_y$ by selecting a table element whose indices in the shuffled table match the first and the second values. In other words, since a pair of the indices (p, q) in the shuffled table matches the first and the second values ($i_x$, $j_y$), $[Z_{p,q}]$ of the matched indices (p, q) is the secret shares $[i_x j_y]$ of the product of the first value $i_x$ and the second value $j_y$.

Further, whether or not the indices (p, q) in the shuffled table match the first and the second values ($i_x$, $j_y$) may be determined and securely computed using the shares $[i_x]$ of the first value and the shares $[j_y]$ of the second value as inputs and shares ([p], [q]) of the indices in the shuffled table. One only needs to calculate ($[i_x - p]$, $[j_y - q]$) and see if it equals ([0], [0]).

Meanwhile, as stated above, the computation above also requires a party to receive from another party a share value that he/she does not have. In such a situation in which a party receives from another party a share value that he/she does not have, there may be an adversary among the parties who may transmit the wrong value, instead of the correct value.

Therefore, the comparative verification part 114 accepts data that a majority agrees on as a correct value out of a plurality of data received from other secure computation server apparatuses. As stated above, the present configuration example uses a secret sharing scheme with a replication degree of 3t+1. This means that 3t+1 parties hold the same share element. In other words, when a party receives a share value that he/she does not have from another party, the same element can be received from 3t+1 parties, and out of a plurality of values received, data that a majority agrees on is accepted as a correct value. Therefore, in the configuration of the first example embodiment, it is possible to continue to perform correct secure computation without interrupting the process even if some of the 0-th to the (N−1)-th secure computation server apparatuses 110$_i$ (i=0, 1, . . . , N−1) are operated by adversaries.

As described, in the secure computation system 100 relating to the first example embodiment, each of the 0-th to the (N−1)-th secure computation server apparatuses $_i$ (i=0, 1, . . . , N−1) comprises the table storage part 111, the table shuffle part 112, the multiplication part 113, and the comparative verification part 114 to perform secure computation of secret shares of the product of the secret-shared first value and the secret-shared second value from shares of the first value and shares of the second value. Further, in the secure computation system 100 relating to the first example embodiment, by having each of the 0-th to the (N−1)-th secure computation server apparatuses 110$_i$ (i=0, 1, . . . , N−1) configured as above, it is possible to continue to perform correct secure computation without interrupting the process even if some of the 0-th to the (N−1)-th secure computation server apparatuses 110$_i$ (i=0, 1, . . . , N−1) are operated by adversaries. Moreover, a number of the secure computation server apparatuses 110$_i$ (i=0, 1, . . . , N−1) that satisfies t(3t+1)<N can be employed. In other words, each of the secure computation system 100 and the 0-th to the (N−1)-th secure computation server apparatuses 110$_i$ (i=0, 1, . . . , N−1) relating to the first example embodiment can contribute to improving the security and flexibility of secure computation technology.

(Secure Computation Method)

Figure 3:
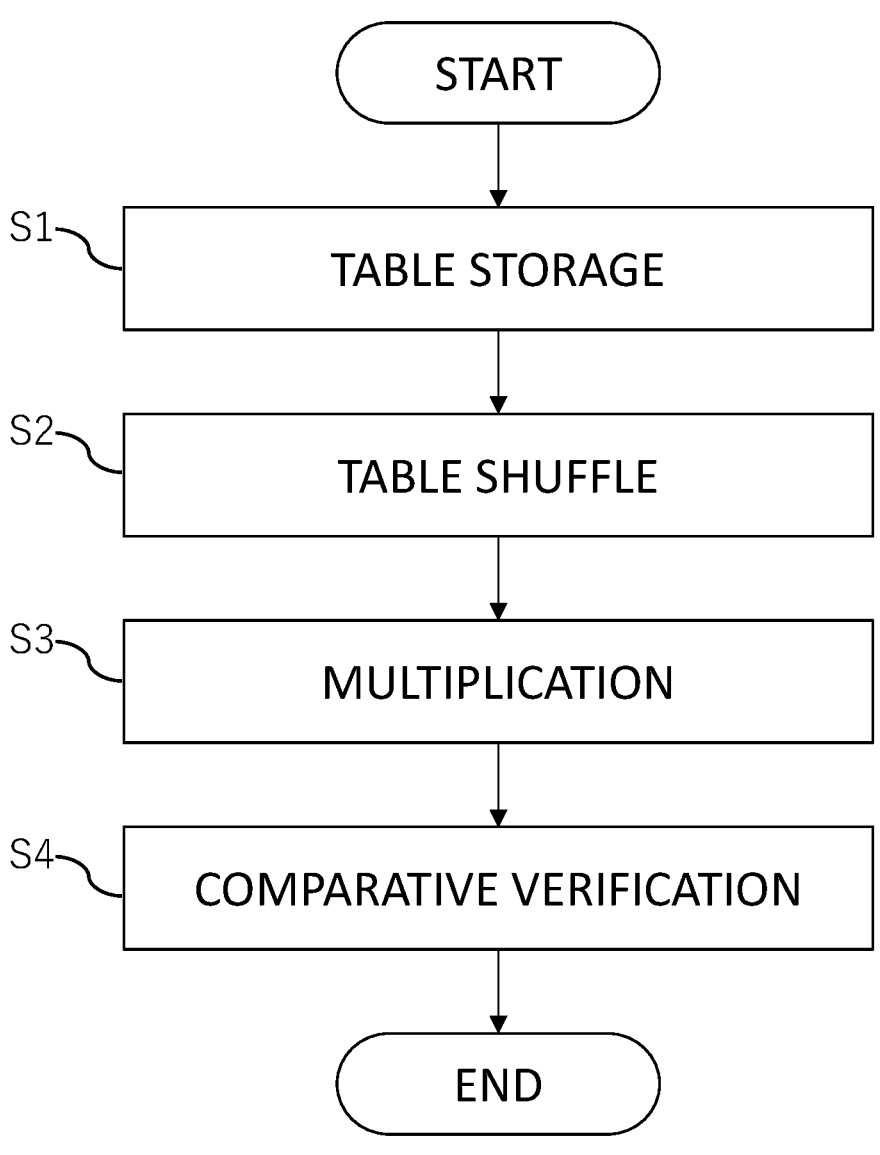
FIG. 3 is a flowchart showing an outline of the procedure of a secure computation method relating to the first example embodiment.

FIG. 3 is a flowchart showing an outline of the procedure of a secure computation method relating to the first example embodiment. The procedure of the secure computation method shown in FIG. 3 is merely a typical example of a secure computation procedure for facilitating the description, and in an actual secure computation method, it is normal to make changes such as executing only some steps, executing the steps in a different order, or repeating some steps.

As shown in FIG. 3, the secure computation method relating to the first example embodiment has a table storage step (step S1), a table shuffle step (step S2), a multiplication step (step S3), and a comparative verification step (step S4).

In the table storage step (the step S1), the secure computation server apparatus 110$_i$ stores a table of secret shares of the product of the first value and the second value for combinations of shares of possible values of the first value and shares of possible values of the second value. Here, the table is obtained by secret-sharing a multiplication table, as stated above. Since this table can be easily constructed from ordinary multiplication, it is sufficient to store it in variables as needed during actual implementation. Further, the table can be constructed in so-called offline processing without waiting for input.

In the table shuffle step (the step S2), the secure computation server apparatus 110$_i$ shuffles the indices of possible values of the first value and the indices of possible values of the second value in the table. The shuffled table loses the row and column information.

In the multiplication step (the step S3), the secure computation server apparatus 110$_i$ obtains the secret shares [i$_x$,j$_y$,] of the product of the first value i$_x$ and the second value j$_y$, by selecting a table element whose indices in the shuffled table match the first and the second values.

Meanwhile, in the comparative verification step (the step S4), the secure computation server apparatus 110$_i$ accepts data that a majority of other secure computation server apparatuses agrees on as a correct value out of a plurality of data received from the other secure computation server apparatuses. Note that the comparative verification step (the step S4) is executed when a party receives from another party a share value that he/she does not have. In other words, as part of the table shuffle step (the step S2) and the multiplication step (the step S3), the comparative verification step is executed each time a party receives from another party a share value that he/she does not have.

As described, the secure computation method relating to the first example embodiment has the table storage step (the step 1), the table shuffle step (the step 2), the multiplication step (the step 3), and the comparative verification step (the step 4) to perform secure computation of secret shares of the product of the secret-shared first value and the secret-shared second value from shares of the first value and shares of the second value. Further, in the secure computation method relating to the first example embodiment, by executing the processes described above, it is possible to continue to perform correct secure computation without interrupting the process even if some of the secure computation server apparatuses 110$_i$ are operated by adversaries. Moreover, a number of the secure computation server apparatuses 110$_i$ that satisfies t(3t+1)<N can be employed. In other words, the secure computation method relating to the first example embodiment can contribute to improving the security and flexibility of secure computation technology.

In the first example embodiment described above, only the basic concept of the present invention was discussed. In order to apply the present invention to a practical example embodiment, it is necessary to apply the concept described above to a series of processes including addition and multiplication. In the following second example embodiment, the concept described above is applied to a practical example embodiment.

Second Example Embodiment

Figure 4:
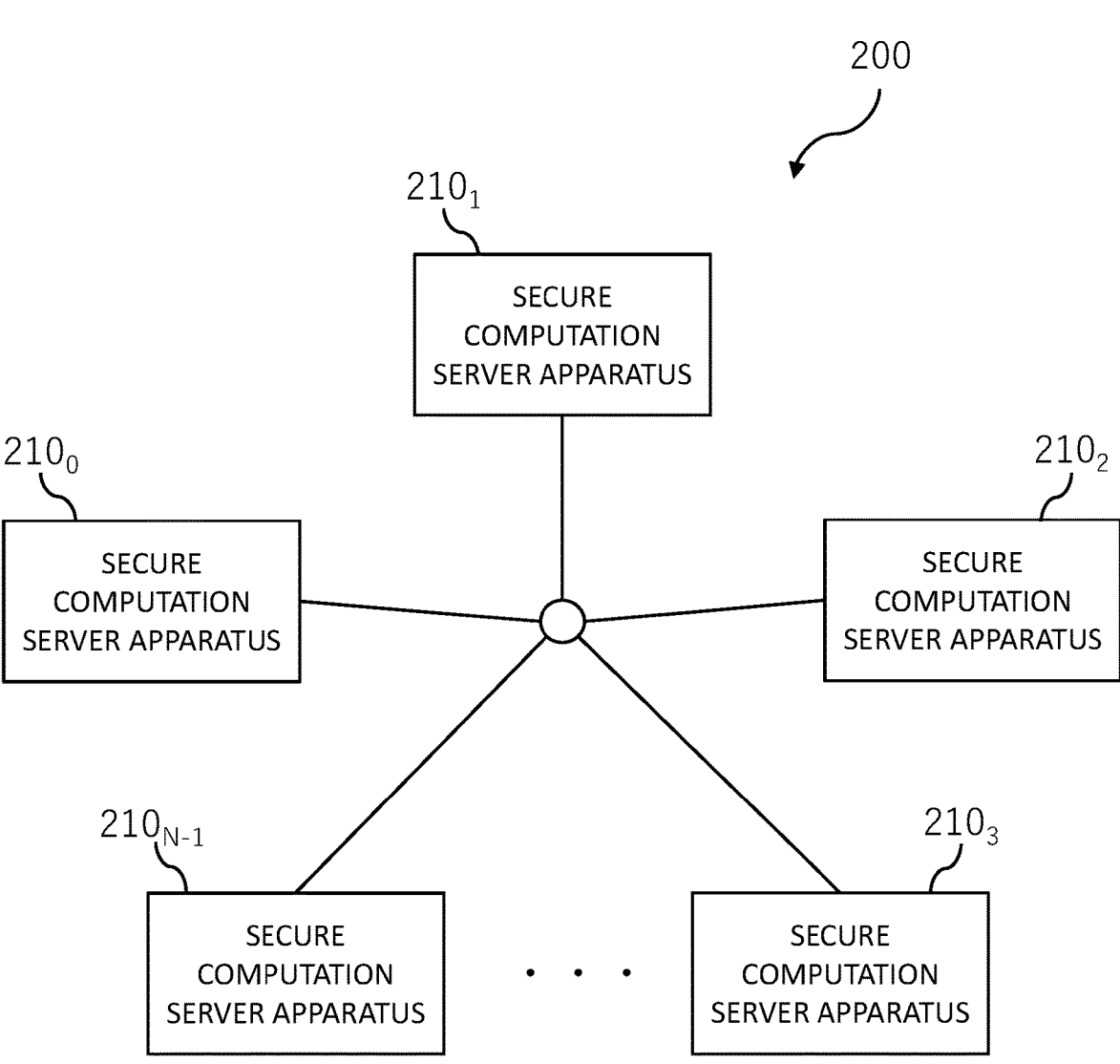
FIG. 4 is a block diagram showing an example of the functional configuration of a secure computation system relating to a second example embodiment.

The following describes a secure computation system relating to the second example embodiment with reference to FIG. 4.

FIG. 4 is a block diagram showing an example of the functional configuration of the secure computation system relating to the second example embodiment. As shown in FIG. 4, the secure computation system 200 relating to the second example embodiment comprises 0-th to (N−1)-th secure computation server apparatuses 210$_i$ (i=0, 1, . . . , N−1). The 0-th to the (N−1)-th secure computation server apparatuses 210$_i$ (i=0, 1, . . . , N−1) are connected to each other via a network so as to be able to communicate with each other.

Each of the 0-th to the (N−1)-th secure computation server apparatuses 210$_i$ (i=0, 1, . . . , N−1) is operated by an independent party P$_i$ (i=0, 1, . . . , N−1). Further, the secure computation system 200 comprising the 0-th to the (N−1)-th secure computation server apparatuses 210$_i$ (i=0, 1, . . . , N−1) is able to continue correct secure computation without interrupting the process even when some of the 0-th to the (N−1)-th secure computation server apparatuses $210_i$ (i=0, 1, . . . , N−1) are operated by adversaries.

[Preparation]

For instance, the secure computation system 200 relating to the second example embodiment may employ the following configuration.

As in the first example embodiment, the secure computation system 200 relating to the second example embodiment may employ the (N−3t)-out-of-N replicated secret sharing scheme. In other words, the shares over the residue class ring $Z_L$ of an element $x \in Z_L$ of the residue class ring $Z_L$ of order L are configured as below:

$$[x]_L = ([x]_{L,0}, [x]_{L,1}, \ldots , [x]_{L,N-1})$$

$$x = x_0 + x_1 + \ldots + x_{N-1} \bmod L$$

$$[x]_{L,i} = (x_i, x_{i+1}, \ldots , x_{i+3t}) \text{ where } x_{(N-1)+1} = x_0$$

Here, $P(x_i)$ is defined as a set of parties holding an element $x_i$ of the secret shares described above. As can be seen from the definitions, the number of elements in the set is: $|P(x_i)| = 3t+1$.

Further, each party $P_i$ has $(k_i, \ldots , k_{i+3t})$ as seeds, where $k_i \in \{0, 1\}^\kappa$.

In addition, a party belonging to $P(x_i) \square N_j$ has an additional seed $k_{x,j}$ for shuffling described later. Note that $N_j$ is a set of any t parties (j=0, 1, . . . , $_NC_t-1$).

A pseudorandom function $F_L$ outputs $Z_L$ using the seeds as inputs as follows:

$$F_L: \{0,1\}^\kappa \times \{0,1\}^\kappa \to Z_L$$

Further, with an M-length array $x = (x_0, \ldots , x_j, \ldots , x_{M-1})$, $x_j$ is decomposed as follows: $x_j = x_{j,0} + x_{j,1}, + \ldots + x_{j,N-1}$, mod L. Then, $x_i = (x_{0,i}, \ldots , x_{M-1, i})$.

[Building Blocks]

The following describes building blocks used as elements to perform secure computation of secret shares of the product of the secret-shared first value and the secret-shared second value from shares of the first value and shares of the second value in the secure computation system 200 relating to the second example embodiment.

[Reconstruction]

Here, we will consider a case where a party $P_i$ reconstructs $x \in Z_L$ from $[x]_L$.

The party $P_i$ needs $x_1, \ldots , x_{i-1}, x_{i+(3t+1)}, \ldots , x_{N-1}$, in order to reconstruct $x \in Z_L$. In other words, since the party $P_i$ has $[x]_{L,i} = (x_i, x_{i+1}, \ldots , x_{i+3t})$, he/she needs the rest: $x_1, \ldots , x_{i-1}, x_{i+(3t+1)}, \ldots , x_{N-1}$.

Now, let's take a look at a set $P(x_j)$ of parties holding a share element $x_j$(j=1, . . . , i−1, i+(3t+1), . . . , N−1). Then, a party $P_z \in P(x_j)$ transmits $x_j$ to the party $P_i$. Note that this transmission process is executed for each share element $x_j$(j=1, . . . , i−1, i+(3t+1), . . . , N−1).

Meanwhile, the party $P_i$ compares and verifies the values transmitted by the parties belonging to the set $P(x_j)$ and selects $x_j$ that a majority agrees on as a correct value. Since $|P(x_j)| = 3t+1$, he/she can always select $x_j$ that a majority agrees on as a correct value, as long as the number of adversaries is not greater than t. Further, the communication cost can be reduced by making the values transmitted by some of the parties belonging to the set $P(x_j)$ hash values.

Finally, the party $P_i$ verifies $x_1, \ldots , x_{i-1}, x_{i+(3t+1)}, \ldots , x_{N-1}$ as the correct values by comparing them with $[x]_{L,i} = (x_i, x_{i+1}, \ldots , x_{1+3t})$ and calculates $$x = \sum_{i=0}^{N-1} x_i$$

mod L using the confirmed values. This x is the desired value.

[Input]

Now, let's consider a case where the party $P_i$ supplies $x \in Z_L$ as an input. The output in this case is $[x]_L$.

First, the party $P_i$ generates random numbers $x_1, \ldots , x_{N-1} \in Z_L$ and then lets $x_0$ be $$x_0 = x - \sum_{i=1}^{N-1} x_i$$

mod L.

Next, the party $P_i$ transmits $[x]_{L,i}$ to the other parties $P_j$ (j≠i).

All the parties $P_i$ generates $[r]_L$ from the seeds and the pseudorandom function. More concretely, when $r_i = F_L(uid, k_i)$ and $$r = \sum_{i=1}^{N-1} r_i$$

mod L, shares of the random number r may be created without any communication. It should be noted that nobody knows the value of r at this time.

Then, all the parties $P_i$ calculate $[x+r]_L = [x]_L + [r]_L$. Note that the addition of the shares $[x]_L + [y]_L = [z]_L$ can be done by calculating $[z]_L = ([z]_{L,0}, [z]_{L,1}, \ldots , [z]_{L,N-t})$ so that $z_i = x_i + y_i$ mod L.

Then, all the parties $P_i$ reconstruct $[x+r]_L$ to obtain x+r. The building block [Reconstruction] described above can be used for the reconstruction here.

Now the values of x+r obtained by reconstructing $[x+r]_L$ by all the parties $P_i$ are exchanged and compared to verify the received value of x+r. Then, a value that a majority agrees on is selected from the received values of x+r as a correct value. If no majority is established, the party $P_i$ who is the input dealer is an adversary. Therefore, the party $P_i$ and $x \in Z_L$ supplied by the party $P_i$ as the input are eliminated. Note that, when the values of x+r are exchanged, it is possible to reduce the communication cost by using hash values in some of the communication.

Finally, $[x]_L = x+r-[r]_L$ is obtained as an output.

[Shuffle]

The shuffle here is a composition of mini-shuffles in which permutation for t parties is computed locally by the other parties. Therefore, the following first describes how to configure these mini-shuffles.

Firstly, a permutation that is unknown to t parties but known to the other parties is configured. As stated above, when $N_j$ is a set of any t parties (j=0, 1, . . . , $_NC_t-1$), the parties belonging to $P(x_i) \square N_j$ share the seed $k_{x,j}$. Therefore, a permutation using a pseudorandom number generated from the seed $k_{x,j}$ is unknown to the (t) parties belonging to $N_j$ but known to the other parties belonging to $P(x_i) \square N_j$.

Then, by applying this permutation it configured by themselves to a share element $x_i$, the parties belonging to $P(x_i) \square N_j$ are able to calculate $\pi(x_i)$ locally (without any communication).

Meanwhile, since the (t) parties belonging to $N_j$ cannot calculate $\pi(x_i)$, they ask for the transmission of $\pi(x_i)$ calculated by the parties belonging to $P(x_i)\square N_j$. At this time, from $|P(x_i)|=3t+1$ and $|N_j|=t$, it can be seen that the number of the parties belonging to $P(x_i)\square N_j$ is 2t+1. This means that, even when there are t adversaries among the parties belonging to $P(x_i)\square N_j$, they form a minority among 2t+1 parties.

Therefore, the (t) parties belonging to $N_j$ compare and verify $\pi(x_i)$ received from the parties belonging to $P(x_i)\square N_j$ and accept one that at least t+1 parties agree on as a correct value. Note that it is possible to reduce the communication cost by transmitting the permutation of the shares sent from the parties belonging to $P(x_i)\square N_j$ to those belonging to $N_j$ as a hash value.

By performing such permutation on all $x_i$, one can constitute a mini-shuffle in which permutation for t parties is computed locally by the other parties.

Here, the mini-shuffle configured as described above functions as a shuffle for the parties belonging to $N_j$ since they are not able to track the destination of the permutation. Meanwhile, it does not function as a shuffle for the parties belonging to $P(x_i)\square N_j$ since they are able to track the destination of the permutation.

Therefore, a shuffle is constituted by a composition of $_NC_t$ mini-shuffles ($_NC_t$ is the number of sets of t selected parties). Then, out of the combined mini-shuffles, every party has one that functions as a shuffle since he/she cannot track the destination of the permutation.

[Multiplication]

Figure 5:
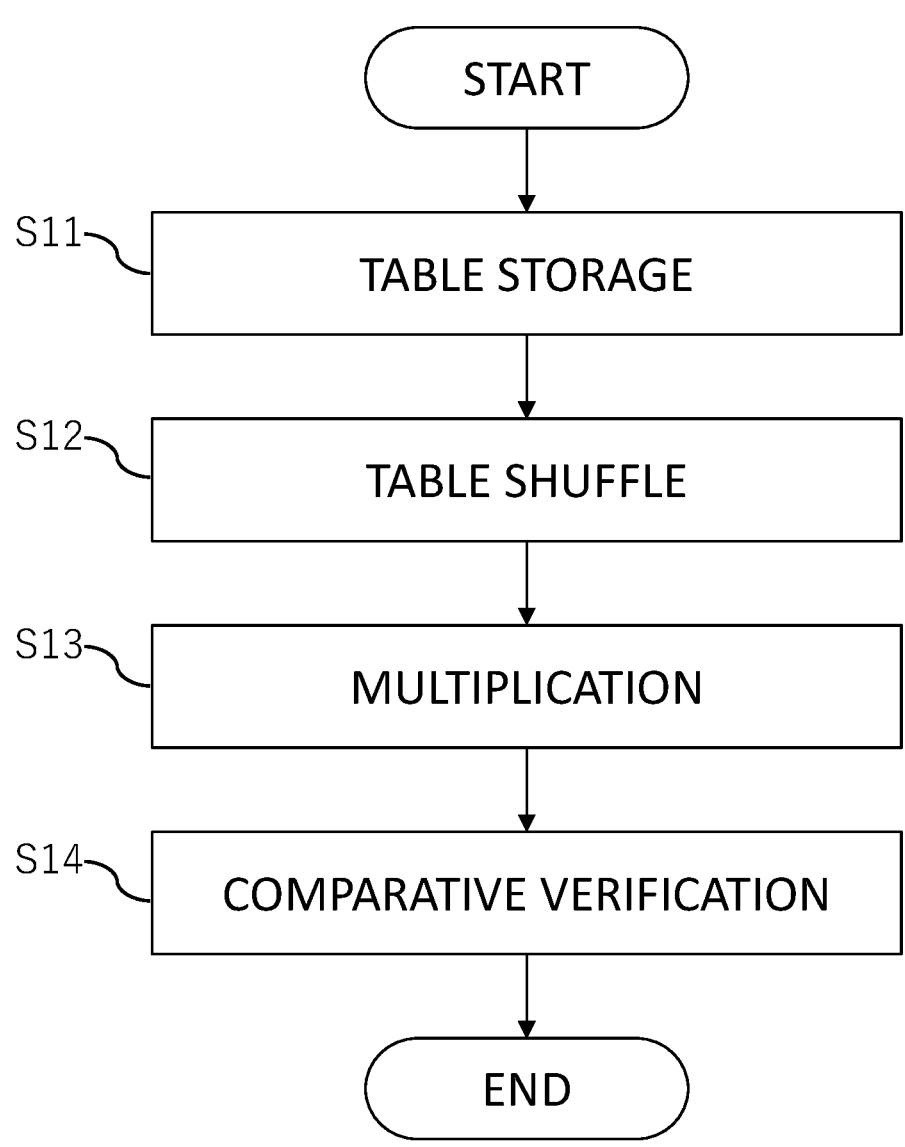
FIG. 5 is a flowchart showing an outline of the procedure of a secure computation method relating to the second example embodiment.

FIG. 5 is a flowchart showing an outline of the procedure of a secure computation method relating to the second example embodiment. In other words, the flowchart in FIG. 5 shows a method for performing secure computation of secret shares of the product of the secret-shared first value and the secret-shared second value from shares of the first value and shares of the second value using the building blocks.

As shown in FIG. 5, the secure computation method relating to the second example embodiment has a table storage step (step S11), a table shuffle step (step S12), a multiplication step (step S13), and a comparative verification step (step S14).

In the table storage step (the step S11), the secure computation server apparatus $210_i$ stores a table of secret shares of the product of the first value and the second value for combinations of shares of possible values of the first value and shares of possible values of the second value. Here, the same table described in the first example embodiment may be used.

In the table shuffle step (the step S12), the secure computation server apparatus $210_i$ shuffles the indices of possible values of the first value and the indices of possible values of the second value in the table. The shuffling here may be executed as in [Shuffle] of the building blocks described above.

Then, in the multiplication step (the step S13), the secure computation server apparatus $210_i$ obtains the secret shares of the product of the first value and the second value by selecting a table element whose indices in the shuffled table match the first and the second values. This process may also be the same as the one described in the first example embodiment.

Further, in the comparative verification step (the step S14), the secure computation server apparatus $210_i$ accepts data that a majority of other secure computation server apparatuses agrees on as a correct value out of a plurality of data received from the other secure computation server apparatuses. As is evident from the description of the building blocks above, the comparative verification step is also incorporated as internal processing into the shuffle and the reconstruction.

As described, the secure computation method relating to the second example embodiment has the table storage step (the step 11), the table shuffle step (the step 12), the multiplication step (the step 13), and the comparative verification step (the step 14) to perform secure computation of secret shares of the product of the secret-shared first value and the secret-shared second value from shares of the first value and shares of the second value. Further, in the secure computation method relating to the second example embodiment, by executing the processes described above, it is possible to continue to perform correct secure computation without interrupting the process even if some of the secure computation server apparatuses $210_i$ are operated by adversaries. Moreover, a number of the secure computation server apparatuses $210_i$ that satisfies t(3t+1)<N can be employed. In other words, the secure computation method relating to the second example embodiment can contribute to improving the security and flexibility of secure computation technology.

[Hardware Configuration]

Figure 6:
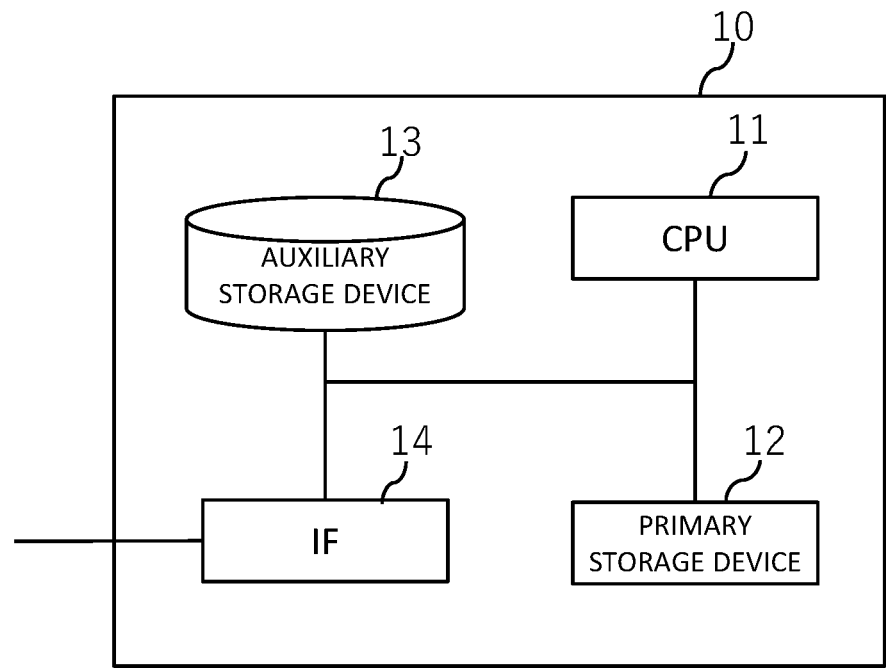
FIG. 6 is a drawing illustrating an example of the hardware configuration of the secure computation server apparatus.

FIG. 6 is a drawing illustrating an example of the hardware configuration of the secure computation server apparatus. In other words, FIG. 6 shows an example of the hardware configuration of the secure computation server apparatuses $110_i$ and $210_i$ (i=0, 1, . . . , N−1). An information processing apparatus (computer) employing the hardware configuration shown in FIG. 6 can achieve the functions of the secure computation server apparatuses $110_i$ and $210_i$ (i=0, 1, . . . , N−1) by executing the secure computation method described above as a program.

It should be noted that the hardware configuration example shown in FIG. 6 is merely an example of the hardware configuration that achieves the functions of the secure computation server apparatuses $110_i$ and $210_i$ (i=0, 1, . . . , N−1), and is not intended to limit the hardware configuration of the secure computation server apparatuses $110_i$ and $210_i$ (i=0, 1, . . . , N−1). The secure computation server apparatuses $110_i$ and $210_i$ (i=0, 1, . . . , N−1) may include hardware not shown in FIG. 6.

As shown in FIG. 6, the hardware configuration 10 that may be employed by the secure computation server apparatuses $110_i$ and $210_i$ (i=0, 1, . . . , N−1) comprises a CPU (Central Processing Unit) 11, a primary storage device 12, an auxiliary storage device 13, and an IF (interface) part 14. These elements are connected to each other by, for instance, an internal bus.

The CPU 11 executes each instruction included in the secure computation program executed by the secure computation server apparatuses $110_i$ and $210_i$ (i=0, 1, . . . , N−1). The primary storage device 12 is, for instance, a RAM (Random Access Memory) and temporarily stores various programs such as the secure computation program executed by the secure computation server apparatuses $110_i$ and $210_i$ (i=0, 1, . . . , N−1) so that the CPU 11 can process the programs.

The auxiliary storage device 13 is, for instance, an HDD (Hard Disk Drive) and is capable of storing the various programs, such as the secure computation program executed by the secure computation server apparatuses $110_i$ and $210_i$ (i=0, 1, . . . , N−1), in the medium to long term. The various programs such as the secure computation program may be provided as a program product stored in a non-transitory computer-readable storage medium. The auxiliary storage device 13 can be used to store the various programs such as the secure computation program stored in the non-transitory computer-readable storage medium in the medium to long term. The IF part 14 provides an interface to the input and output between the secure computation server apparatuses 110$_i$ and 210$_i$ (i=0, 1, . . . , N–1).

The information processing apparatus employing the hardware configuration 10 described above can achieve the functions of the secure computation server apparatuses 110$_i$ and 210$_i$ (i=0, 1, . . . , N–1) by executing the secure computation method described above as a program.

Some or all of the example embodiments above can be described as (but not limited to) the following Supplementary Notes.

Supplementary Note 1

A secure computation system comprising a plurality of secure computation server apparatuses connected to each other via a network and performing secure computation of secret shares of the product of a secret-shared first value and a secret-shared second value from shares of the first value and shares of the second value, wherein each of the secure computation server apparatuses includes:

a table storage part that stores a table of secret shares of the product of the first value and the second value for combinations of shares of possible values of the first value and shares of possible values of the second value;

a table shuffle part that shuffles indices of possible values of the first value and indices of possible values of the second value in the table;

a multiplication part that selects an element in the table whose indices in the shuffled table match the first and the second values; and a comparative verification part that accepts data that a majority of other secure computation server apparatuses agrees on as a correct value out of a plurality of data received from the other secure computation server apparatuses.

Supplementary Note 2

The secure computation system according to Supplementary Note 1, wherein the secret sharing is achieved by using an (N–3t)-out-of-N replicated secret sharing scheme, and the shuffling is a composition of mini-shuffles in which the permutation of shares for t apparatuses out of the secure computation server apparatuses is computed locally by other secure computation server apparatuses out of the secure computation server apparatuses.

Supplementary Note 3

The secure computation system according to Supplementary Note 2, wherein the comparative verification part accepts as a correct value a share permutation that at least t+1 apparatuses agree on out of share permutations received from the other secure computation server apparatuses.

Supplementary Note 4

The secure computation system according to Supplementary Note 2 or 3, wherein the mini-shuffle locally computed by the other secure computation server apparatuses is configured by using a pseudorandom number generated from a seed not held by the t secure computation server apparatuses but shared by the other secure computation server apparatuses.

Supplementary Note 5

The secure computation system according to any one of Supplementary Notes 2 to 4, wherein the shuffling is a composition of $_NC_t$ sequences of the mini-shuffles with $_NC_t$ being the number of sets of the t secure computation server apparatuses selected from N secure computation server apparatuses.

Supplementary Note 6

The secure computation system according to any one of Supplementary Notes 1 to 4, wherein the comparative verification part verifies that the received value is a correct value by verifying that hash values of the plurality of received data are identical.

Supplementary Note 7

A secure computation server apparatus out of a plurality of secure computation server apparatuses connected to each other via a network to perform secure computation of secret shares of the product of a secret-shared first value and a secret-shared second value from shares of the first value and shares of the second value, the secure computation server apparatus including:

a table storage part that stores a table of secret shares of the product of the first value and the second value for combinations of shares of possible values of the first value and shares of possible values of the second value;

a table shuffle part that shuffles indices of possible values of the first value and indices of possible values of the second value in the table;

a multiplication part that selects an element in the table whose indices in the shuffled table match the first and the second values; and a comparative verification part that accepts data that a majority of other secure computation server apparatuses agrees on as a correct value out of a plurality of data received from the other secure computation server apparatuses.

Supplementary Note 8

A secure computation method, with a plurality of secure computation server apparatuses connected to each other via a network, performing secure computation of secret shares of the product of a secret-shared first value and a secret-shared second value from shares of the first value and shares of the second value, wherein each of the secure computation server apparatuses:

stores a table of secret shares of the product of the first value and the second value for combinations of shares of possible values of the first value and shares of possible values of the second value;

shuffles indices of possible values of the first value and indices of possible values of the second value in the table;

selects an element in the table whose indices in the shuffled table match the first and the second values; and accepts data that a majority of other secure computation server apparatuses agrees on as a correct value out of a plurality of data received from the other secure computation server apparatuses.

Supplementary Note 9

The secure computation method according to Supplementary Note 8, wherein
the secret sharing is achieved by using an (N−3t)-out-of-N replicated secret sharing scheme, and
the shuffling is a composition of mini-shuffles in which the permutation of shares for t apparatuses out of the secure computation server apparatuses is computed locally by other secure computation server apparatuses out of the secure computation server apparatuses.

Supplementary Note 10

A secure computation program causing a plurality of secure computation server apparatuses connected to each other via a network to execute processing to perform secure computation of secret shares of the product of a secret-shared first value and a secret-shared second value from shares of the first value and shares of the second value, the secure computation program:
stores a table of secret shares of the product of the first value and the second value for combinations of shares of possible values of the first value and shares of possible values of the second value;
shuffles indices of possible values of the first value and indices of possible values of the second value in the table;
selects an element in the table whose indices in the shuffled table match the first and the second values; and
accepts data that a majority of other secure computation server apparatuses agrees on as a correct value out of a plurality of data received from the other secure computation server apparatuses.

Further, the disclosure of Non-Patent Literature cited above is incorporated herein in its entirety by reference thereto. It is to be noted that it is possible to modify or adjust the example embodiments or examples within the scope of the whole disclosure of the present invention (including the Claims) and based on the basic technical concept thereof. Further, it is possible to variously combine or select (or partially omit) a wide variety of the disclosed elements (including the individual elements of the individual claims, the individual elements of the individual example embodiments or examples, and the individual elements of the individual figures) within the scope of the whole disclosure of the present invention. That is, it is self-explanatory that the present invention includes any types of variations and modifications to be done by a skilled person according to the whole disclosure including the Claims and the technical concept of the present invention. Particularly, any numerical ranges disclosed herein should be interpreted that any intermediate values or subranges falling within the disclosed ranges are also concretely disclosed even without specific recital thereof. In addition, using some or all of the disclosed matters in the literatures cited above as necessary, in combination with the matters described herein, as part of the disclosure of the present invention in accordance with the object of the present invention shall be considered to be included in the disclosed matters of the present application.

REFERENCE SIGNS LIST

100, 200: secure computation system
110$_i$, 210$_i$: secure computation server apparatus

111: table storage part
112: table shuffle part
113: multiplication part
114: comparative verification part
10: hardware configuration
11: CPU (Central Processing Unit)
12: primary storage device
13: auxiliary storage device
14: IF (interface) part

What is claimed is:

1. A secure computation system, comprising a plurality of secure computation server apparatuses connected to each other via a network and performing secure computation of secret shares of the product of a secret-shared first value and a secret-shared second value from shares of the first value and shares of the second value, wherein each of the secure computation server apparatuses includes:
a table storage part that stores a table of secret shares of the product of the first value and the second value for combinations of shares of possible values of the first value and shares of possible values of the second value, wherein the secret sharing is achieved by using an (N−3t)-out-of-N replicated secret sharing scheme, and the shuffling is a composition of mini-shuffles in which permutation of shares for t apparatuses out of the secure computation server apparatuses is computed locally by other secure computation server apparatuses out of the secure computation server apparatuses;
a table shuffle part that shuffles indices of possible values of the first value and indices of possible values of the second value in the table;
a multiplication part that selects an element in the table whose indices in the shuffled table match the first and the second values; and
a comparative verification part that accepts data that a majority of other secure computation server apparatuses agrees on as a correct value out of a plurality of data received from the other secure computation server apparatuses.

2. The secure computation system according to claim 1, wherein the comparative verification part accepts as a correct value a share permutation that at least t+1 apparatuses agree on out of share permutations received from the other secure computation server apparatuses.

3. The secure computation system according to claim 1, wherein the mini-shuffle locally computed by the other secure computation server apparatuses is configured by using a pseudorandom number generated from a seed not held by the t secure computation server apparatuses but shared by the other secure computation server apparatuses.

4. The secure computation system according to claim 1, wherein the shuffling is a composition of $_NC_t$ sequences of the mini-shuffles with $_NC_t$ being the number of sets of the t secure computation server apparatuses selected from N secure computation server apparatuses.

5. The secure computation system according to claim 1, wherein the comparative verification part verifies that the received value is a correct value by verifying that hash values of the plurality of received data are identical.

6. A secure computation server apparatus out of a plurality of secure computation server apparatuses connected to each other via a network to perform secure computation of secret shares of the product of a secret-shared first value and a secret-shared second value from shares of the first value and shares of the second value, the secure computation server apparatus including:

a table storage part that stores a table of secret shares of
the product of the first value and the second value for
combinations of shares of possible values of the first
value and shares of possible values of the second value,
wherein the secret sharing is achieved by using an
(N−3t)-out-of-N replicated secret sharing scheme, and
the shuffling is a composition of mini-shuffles in which
permutation of shares for t apparatuses out of the secure
computation server apparatuses is computed locally by
other secure computation server apparatuses out of the
secure computation server apparatuses;

a table shuffle part that shuffles indices of possible values
of the first value and indices of possible values of the
second value in the table;

a multiplication part that selects an element in the table
whose indices in the shuffled table match the first and
the second values; and a comparative verification part that accepts data that a
majority of other secure computation server appara-
tuses agrees on as a correct value out of a plurality of
data received from the other secure computation server
apparatuses.

7. A secure computation method, with a plurality of secure
computation server apparatuses connected to each other via
a network, performing secure computation of secret shares
of the product of a secret-shared first value and a secret-
shared second value from shares of the first value and shares
of the second value, wherein each of the secure computation
server apparatuses:

stores a table of secret shares of the product of the first
value and the second value for combinations of shares
of possible values of the first value and shares of
possible values of the second value, wherein the secret
sharing is achieved by using an (N−3t)-out-of-N rep-
licated secret sharing scheme, and the shuffling is a
composition of mini-shuffles in which permutation of
shares fort apparatuses out of the secure computation
server apparatuses is computed locally by other secure
computation server apparatuses out of the secure com-
putation server apparatuses;

shuffles indices of possible values of the first value and
indices of possible values of the second value in the
table;

selects an element in the table whose indices in the
shuffled table match the first and the second values; and accepts data that a majority of other secure computation
server apparatuses agrees on as a correct value out of a
plurality of data received from the other secure com-
putation server apparatuses.

8. A non-transient computer readable medium storing a
secure computation program causing a plurality of secure
computation server apparatuses connected to each other via
a network to execute processing to perform secure compu-
tation of secret shares of the product of a secret-shared first
value and a secret-shared second value from shares of the
first value and shares of the second value, the secure
computation program:

stores a table of secret shares of the product of the first
value and the second value for combinations of shares
of possible values of the first value and shares of
possible values of the second value, wherein the secret
sharing is achieved by using an (N−3t)-out-of-N replicated secret sharing scheme, and the shuffling is a
composition of mini-shuffles in which permutation of
shares fort apparatuses out of the secure computation
server apparatuses is computed locally by other secure
computation server apparatuses out of the secure com-
putation server apparatuses;

shuffles indices of possible values of the first value and
indices of possible values of the second value in the
table;

selects an element in the table whose indices in the
shuffled table match the first and the second values; and accepts data that a majority of other secure computation
server apparatuses agrees on as a correct value out of a
plurality of data received from the other secure com-
putation server apparatuses.

9. The secure computation server apparatus according to
claim 6, wherein the comparative verification part accepts as
a correct value a share permutation that at least t+1 appa-
ratuses agree on out of share permutations received from the
other secure computation server apparatuses.

10. The secure computation server apparatus according to
claim 6, wherein the mini-shuffle locally computed by the
other secure computation server apparatuses is configured
by using a pseudorandom number generated from a seed not
held by the t secure computation server apparatuses but
shared by the other secure computation server apparatuses.

11. The secure computation server apparatus according to
claim 6, wherein the shuffling is a composition of $_NC_t$
sequences of the mini-shuffles with $_NC_t$ being the number of
sets of the t secure computation server apparatuses selected
from N secure computation server apparatuses.

12. The secure computation method according to claim 7,
wherein each of the secure computation server apparatuses
accepts as a correct value a share permutation that at least
t+1 apparatuses agree on out of share permutations received
from the other secure computation server apparatuses.

13. The secure computation server method according to
claim 7, wherein the mini-shuffle locally computed by the
other secure computation server apparatuses is configured
by using a pseudorandom number generated from a seed not
held by the t secure computation server apparatuses but
shared by the other secure computation server apparatuses.

14. The secure computation server method according to
claim 7, wherein the shuffling is a composition of $_NC_t$
sequences of the mini-shuffles with $_NC_t$ being the number of
sets of the t secure computation server apparatuses selected
from N secure computation server apparatuses.

15. The non-transient computer readable medium storing
the secure computation program according to claim 8,
wherein the secure computation program accepts as a correct
value a share permutation that at least t+1 apparatuses agree
on out of share permutations received from the other secure
computation server apparatuses.

16. The non-transient computer readable medium storing
the secure computation program according to claim 8,
wherein the mini-shuffle locally computed by the other
secure computation server apparatuses is configured by
using a pseudorandom number generated from a seed not
held by the t secure computation server apparatuses but
shared by the other secure computation server apparatuses.

* * * * *